Jan. 11, 1949.  E. N. DOUBRAVA  2,458,899
COUPLING
Filed March 7, 1946  2 Sheets-Sheet 1
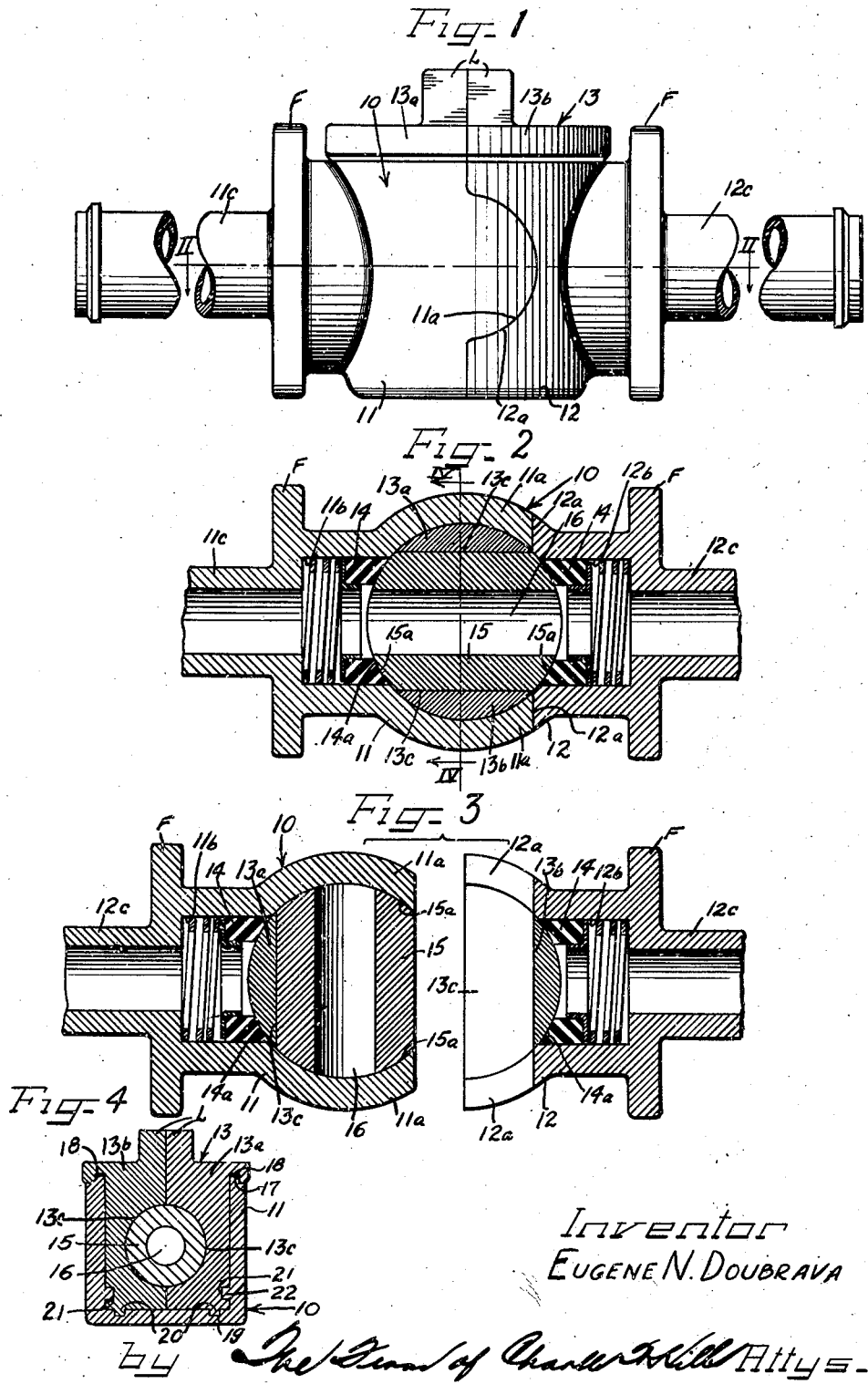
Inventor
EUGENE N. DOUBRAVA Jan. 11, 1949.  E. N. DOUBRAVA  2,458,899
COUPLING
Filed March 7, 1946  2 Sheets-Sheet 2
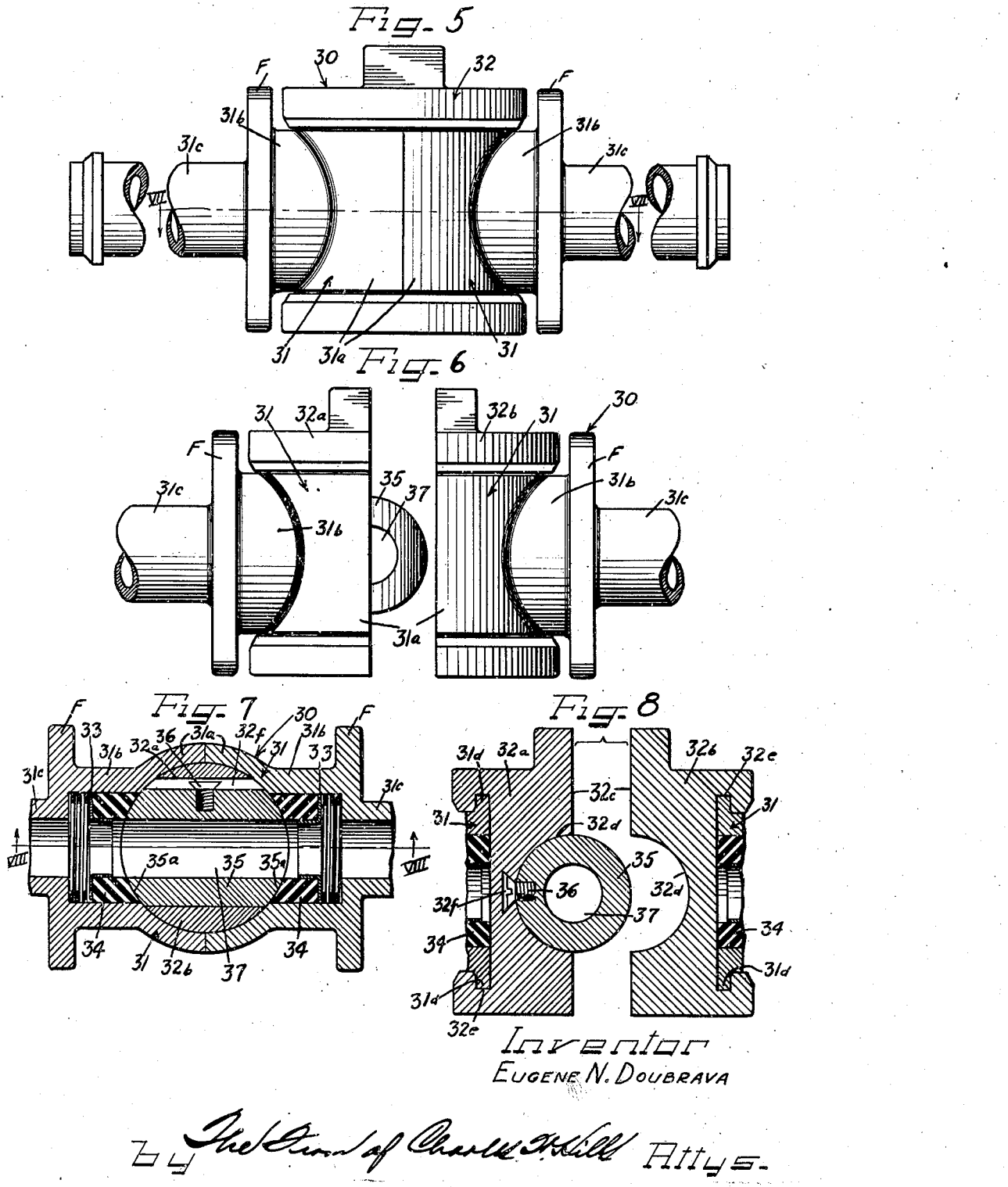
Inventor
EUGENE N. DOUBRAVA Patented Jan. 11, 1949

2,458,899

UNITED STATES PATENT OFFICE 2,458,899

COUPLING

Eugene N. Doubrava, Cleveland, Ohio, assignor to Thompson Products, Inc., Cleveland, Ohio, a corporation of Ohio Application March 7, 1946, Serial No. 652,608

3 Claims. (Cl. 284—4)

This invention relates to self-sealing couplings of the type disclosed in the George H. Hufferd Patent 2,326,143, dated August 10, 1943, but equipped with a separate conduit tube carried by the half-sections of the coupling valve or plug to connect the ports of the coupling in full fluid flow communication.

Specifically, this invention deals with quick disconnect couplings of the type having coupling boxes connected in fluid flow communication by a split plug valve, wherein an independent conduit tube is provided to join the ports of the coupling boxes so that the plug valve pieces can be identical.

In the disclosure of the Hufferd Patent 2,326,143, the plug or valve for the coupling is composed of a male part and a female part. The male part has a semi-cylindrical wall projecting from its face to partially define the conduit passage which joins the ports of the coupling box. The female plug part has a semi-cylindrical recess for receiving this projecting wall of the male part. This construction requires separate castings and necessitates two sets of milling cutters, thereby increasing the production costs.

According to the present invention, production cost is greatly reduced by making the valve plug in two identical half sections, and by providing a separate conduit tube that will fit in any of the identical sections. This conduit or flow tube can be allowed to move in the valve plug relative to both sections thereof so that it will align itself with the sealing surfaces of the port seals carried by the coupling boxes to insure against leakage. Since the flow tube has a uniformly thick cross section, pressure forces in the tube are uniformly distributed and concentrated stresses at localized portions are eliminated.

The couplings of this invention include a pair of mating ported coupling boxes cooperating to define a valve chamber. A longitudinally split plug valve composed of two identical half sections is rotatably mounted in this chamber. This valve has a transverse hole therethrough receiving the flow tube preferably in slidable relation. The flow tube has end faces adapted to seat on seals carried in the ports of the coupling boxes when the valve is rotated to connect the boxes in fluid flow relation. Each valve piece is retained in a coupling box to seal the port of the box when the valve is rotated to disconnect or uncouple the boxes. When the valve is rotated to connect the ports of the boxes, cooperating tongues and grooves on the valve pieces join the boxes in secured-together or coupled relation. The coupling boxes can be made in interfitting male and female form with the male box having side ears projecting into recesses in the side walls of the female box. These ears extend over the ends of the flow tube to retain the tube in the valve piece that is seated in the male coupling box when the boxes are disconnected. Alternately, the coupling boxes can be of identical shape and construction, with flat mating faces. In this alternative arrangement, it is preferable to retain the flow tube in one of the valve pieces so that it will not drop out of the valve piece when the boxes are disconnected. In order to maintain the floating of the flow tube in the valve, in this alternative construction, a slidable retainer arrangement can be provided.

It is, then, an object of this invention to provide quick disconnect couplings of the type disclosed in the Hufferd Patent 2,326,143 with separate flow tubes, making possible the use of a split plug or valve composed of identical sections.

Another object of this invention is to provide a floating flow tube for quick disconnect couplings.

A still further object of the invention is to decrease the cost of quick disconnect couplings of the type having coupling boxes joined in fluid flow communication by a split plug valve, and sealed in uncoupled relation by the valve pieces.

A still further object of the invention is to eliminate heretofore necessary separate castings and machining operations for the sections of the coupling valve in a quick disconnect coupling.

A specific object of the invention is to provide a separate flow tube in identical half sections of a coupling valve to sealingly engage the port seals of coupling boxes in which the valve is mounted for placing the ports in full fluid flow communication without subjecting the valve to fluid pressure.

Other and further objects of the invention will be apparent to those skilled in the art from the following detailed description of the annexed sheets of drawings which, by way of preferred examples only, illustrate two embodiments of the invention.

On the drawings:

Figure 1 is a side elevational view of a coupling according to this invention illustrating the parts in coupled-together relation.

Figure 2 is a horizontal cross-sectional view taken along the line II—II of Figure 1.

Figure 3 is a view similar to Figure 2 but illustrating the coupling in disconnected position.

Figure 4 is a vertical cross-sectional view taken along the line IV—IV of Figure 2.

Figure 5 is a side elevational view of an alternate form of coupling according to this invention, illustrating the parts in coupled-together relation.

Figure 6 is a view similar to Figure 5, but illustrating the coupling parts in sealed disconnected or uncoupled relation.

Figure 7 is a horizontal cross-sectional view taken along the line VII—VII of Figure 5.

Figure 8 is a vertical cross-sectional view taken along the line VIII—VIII of Figure 7 but illustrating the valve plug rotated 90° from the coupled position shown in Figure 7 to the uncoupled position, and illustrating only fragmentary parts of the casings.

As shown on the drawings:

In Fgures 1 to 4, the reference numeral 10 designates generally one form of coupling according to this invention. The coupling 10 is composed of a male coupling box 11 and a female coupling box 12 having mating end faces. The coupling boxes, when their end faces are mated together, cooperate to define an open-topped closed-bottomed cylindrical cup or chamber. This chamber receives a cylindrical plug valve 13 composed of two identical half sections 13a and 13b.

The male coupling box 11 has opposed fragmentary circular ears 11a, 11a on the side walls thereof extending forwardly from the flat face of the box and having a cylindrical contour so that their ends extend inwardly toward each other to envelop and retain a member seated on the inside faces thereof.

The female coupling box 12 has fragmentary opposed circular recesses 12a, 12a in the side walls thereof for receiving the ears 11a, 11a when the boxes are mated together.

The male coupling box 11 has a laterally extending port 11b joining the cylindrical chamber portion thereof with a conduit nipple portion 11c. The female coupling box has a similar port 12b joining the cylindrical chamber portion thereof with a conduit nipple 12c. The ports 11b and 12b are formed in neck portions extending outwardly from the main fragmental cylindrical body portions of the coupling boxes on the side walls of these boxes remote from their flat mating faces, as shown, and these neck portions carry flanges F, F adapting the coupling boxes for attachment to mountings or other supports.

Spring pressed seals 14 are provided in the ports 11b and 12b and have arcuate inner faces 14a to engage and fit on the cylindrical periphery of the valve 13 in the chamber provided by the coupling boxes.

The valve piece 13a has a semi-cylindrical hole 13c extending transversely therethrough with its major diameter at the flat mating face of the valve piece. The valve piece 13b has a similar semi-cylindrical hole 13c therethrough registering with the hole in the other valve piece to provide a cylindrical bore through the valve pieces.

In accordance with this invention, a flow tube 15 is mounted in the bore provided by the semi-bore sections 13c, 13c of the valve pieces 13a and 13b. This tube has cylindrically-shaped end faces 15a, 15a terminating flush with the cylindrical side walls of the valve pieces and adapted to seat on the faces 14a of the port seals 14. The flow tube 15 provides a conduit passage 16 for connecting the ports 11b and 12b in full fluid flow communication whenever the valve 13 is rotated to move both of its sections 13a and 13b into both of the coupling boxes 12 and 13 as shown in Figure 2. In this position, the end faces 15a of the flow tube 15 will engage the end faces 14a of the port seals 14 and these port seals will act in opposite directions on the ends of the flow tube which, in effect, floats in the valve pieces. The flow tube is thus sealingly clamped between the port seals, and leakage out of the flow passage 16 is prevented.

When the valve 13 is rotated so that each section 13a and 13b thereof is wholly within one coupling box 11 or 12, the flow tube 15 will be retained by the cylindrically curved ears 11a, 11a of the male coupling box 11 and the boxes can be separated as shown in Figure 3 without the flow tube 15 dropping out of position. In this position of the valve sections in the coupling boxes, their solid cylindrical side walls close the ports 11b and 12b and the seals 14 engage these side walls to prevent leakage out of the ports. The coupling is thus disconnected but each part thereof has its ports sealed.

While Figure 3 shows the tube 15 retained in the valve section 13a, it should be understood that the tube 15 can be retained as well in the valve section 13b by rotating this section into the coupling box 11 and by rotating the section 13a into the coupling box 12. The tube 15, however, is always retained by the male coupling box 11 irrespective of which valve section is seated in this box in the disconnect position of the coupling.

The identical sections 13a and 13b of the valve 13 are cheaply formed from castings or forgings by milling flat mating faces thereon with a standard milling cutter. A pair of such milled valve sections are then clamped together with their milled flat faces in engagement, and a transverse hole is drilled therethrough with 180° of the circumference of the hole in each section. The diameter desired for the cylindrical plug valve is then formed by lathe-turning the clamped-together valve sections. The flow tube can be an inexpensive metal pipe inserted in the bored-in hole of the clamped-together pieces and having its ends turned at the same time the cylindrical diameter of the pieces is formed. Thus, the present invention greatly simplifies and cheapens production of valve for quick disconnect couplings.

As best shown in Figure 4 of the drawings, the valve 13 is effective for joining the coupling boxes together without the aid of any additional clamps or connecting means. As therein shown, each coupling box such as the box 11 has a semi-cylindrical tongue 17 surrounding the open top of the chamber-defining portion thereof. This tongue 17 seats in grooves 18 provided in the valve section 13a and 13b. When the coupling boxes are mated together, the tongues 17 thereon form a complete circle, and when the valve sections are mated together, the grooves 18 therein form a complete circle receiving the tongues. Similar interfitting tongues and grooves 19 and 20 are provided in the bottom portions of the coupling boxes and valve pieces. In addition, to prevent the valve pieces from being lifted out of the cylindrical chambers of the coupling boxes, the valve sections have peripheral grooves 21 in their side walls receiving tongues or ribs 22 on the coupling boxes. When a portion of each valve section 13a and 13b is positioned in each coupling box 11 and 12, the boxes are held together by the cooperating tongues and grooves. When each valve piece is rotated so that it is completely within one coupling box, the tongues and grooves will hold this valve piece in the coupling box, but, since the valve pieces are separable, the coupling boxes can be disconnected.

Thus the couplings of this invention have plug valves which connect coupling boxes in fluid flow communication, and which seal the coupling boxes in disconnected position. The flow tube carried by the valve plugs provides the conduit section for connecting the coupling boxes in fluid flow communication and, since it is floatingly carried in the valve pieces, stresses on the valve pieces are eliminated. Better sealing is also obtained, because opposed spring-pressed seals act on opposite ends of the floating flow tube.

To facilitate rotation of the valve 13, each section 13a and 13b thereof has a lug L provided on the top wall thereof. These lugs mate together when the valve pieces are placed in mating position to provide a wrench-receiving head that is easily engaged by a turning tool to rotate the valve.

In the embodiment of the invention shown in Figures 5 to 8, a quick disconnect coupling 30 has two identical coupling boxes 31, 31 with flat mating faces and a valve plug 32 composed of two substantially identical sections 32a and 32b also having flat mating faces. Each coupling box 31 has a fragmental cylindrical side wall 31a with open end faces, so that, when the boxes are mated together, an open-ended cylindrical valve operating chamber is provided. An integral neck 31b projects laterally from each coupling box to a nipple 31c. Flanges F are provided on the necks 31b for attaching the boxes to mountings or the like.

A port 33, opening into the cylindrical chamber afforded by the side walls of the coupling boxes, is provided in each neck 31b. Each port 33 receives a spring-pressed seal 34.

The valve sections 32a and 32b, as shown in Figure 8, each have flat mating faces 32c and transverse semi-cylindrical holes 32d extending inwardly from these flat faces. Each hole 32d has its major diameter at the flat face 32c so that 180° of the circumference of the hole is contained in each valve piece.

The valve pieces have end flanges overlying the ends of the cylindrical walls 31a of the coupling boxes, and these flanges have semi-cylindrical grooves 32e therearound. The grooves open toward each other and receive tongues 31d on the ends of the cylindrical portions of the coupling boxes 31. When the boxes are mated together, the tongues 31d form cylindrical rims projecting beyond the cylindrical valve-operating chamber and these rims project into the grooves on the opposite ends of the valve pieces 32a and 32b.

The valve piece 32a, in accordance with this invention, has an undercut groove 32f extending transversely therethrough at the bottom of the hole section 32d. This groove 32f has a dovetailed cross section, as shown in Figure 8.

A flow tube 35 is seated in the hole 32d of the valve section 32a and held therein by means of a headed screw 36 having its shank threaded in the tube 35 and having its head riding in the groove 32f. The flow tube 35 has one-half of its circumference seated in the hole 32d of the valve piece 32a and the other half of its circumference projects from the flat face 32c of this valve piece to fit in the hole 32d of the valve piece 32b.

The flow tube 35, if desired, can float in the valve piece 32a by allowing the screw head to ride in the groove 32f or, if desired, the screw can be tightened to lock the flow tube in fixed relation to the valve piece 32a. Alternately, of course, the valve piece 32b could be provided with a groove such as the groove 32f, and the flow tube 35 could be retained by this valve piece 32b.

As shown in Figure 7, the flow tube 35 has cylindrical end faces 35a engaging the seals 34 when the valve is in coupled position and, in the event the screw 36 allows floating movement of the flow tube 35, these seals 34 will act on opposite ends of the floating member and will have equal pressure relationship with this member. The flow tube 35 provides a conduit passage 37 connecting the ports 33 in fluid flow relation.

Each valve piece 32a and 32b is retained by a coupling box 31 to seal the ports thereof when the plug valve is rotated to bring its cylindrical outer wall in covering relation to the port seals. When each valve piece is completely disposed within a coupling box, as shown in Figure 6, the boxes can be separated and the flow tube will be retained by the valve piece 32a in whichever coupling box this piece is retained. The projecting portion of the flow tube 35, as shown in Figure 6, serves to guide the boxes into mated relation since it will fit between the side walls of the opposing box and easily slide into the hole 32d of the other valve piece. Of course, as in the embodiment shown in Figures 1 to 4, when the plug valve is rotated so that a portion of each section 32a and 32b thereof fits into both coupling boxes the cooperating tongues and grooves of the valve pieces and boxes will hold the boxes in coupled-together relation.

The valve pieces 32a and 32b can be inexpensively formed from identical castings or forgings by milling the flat faces 32c thereon, by clamping these faces together, by boring the hole 32d through the clamped-together pieces, by inserting the flow tube 35, and by turning the outer diameter of the clamped-together pieces to the desired size.

From the above descriptions, it will be understood that this invention provides a quick disconnect coupling having coupling valves equipped with separate flow tubes so that the valve sections can be of identical construction thereby eliminating heretofore-encountered additional machining and casting expenses. It will also be understood that the flow tubes provided by this invention produce structures which can withstand higher pressures since the stresses are uniformly distributed around the entire cross section of the flow tube.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A self-sealing quick disconnect coupling comprising a pair of ported coupling boxes having mating end faces and defining when said end faces are mated together a valve-operating chamber, a two-piece valve plug rotatable in said chamber, cooperating means on the coupling boxes and valve pieces for coupling the boxes together when both the valve pieces are rotated into both boxes and for retaining a valve piece in each box when each piece is rotated into one box only to uncouple the boxes in sealed relation, said valve pieces having mating faces with opposed recesses therein defining when said faces are mated together a transverse hole through the valve, a flow tube movably seated in said hole and defining a conduit passage for connecting the ports, and means for retaining the flow tube in one of the valve pieces when the coupling boxes are disconnected, said last mentioned means comprising a dovetailed slot and a cooperating dovetailed projection, said slot extending axially with respect to said tube to permit axial movements of said tube.

2. In a quick disconnect coupling of the type having a split valve for connecting coupling boxes in fluid flow communication and for sealing the coupling boxes in uncoupled relation together with a spring-pressed port seal in each coupling box, the improvement of an axially movable flow tube in the split valve acted on by the opposed port seals when the valve is rotated to place the boxes in fluid flow communication and defining a conduit passage connecting the ports of the boxes.

3. A quick disconnect coupling comprising a pair of identical coupling boxes having flat mating end faces and defining when mated together a cylindrical valve-operating chamber with diametrically opposed ports, a plug valve composed of substantially identical half sections rotatably mounted in said operating chamber, said sections of the valve plug and said coupling boxes having interfitting cooperating tongues and grooves to retain the valve plug in the coupling boxes and to join the boxes in coupled-together relation through the valve pieces when the valve pieces are rotated to be partly positioned in both boxes, said valve pieces having a transverse hole therethrough with half of its periphery in each valve piece, a flow tube in the hole of one of the valve pieces and projecting from the valve piece to be seated in the hole of the other valve piece, said projecting portion of the flow tube functioning to align the boxes for the coupling operation, and said flow tube having opposed ends for alignment with said ports in the coupling boxes to join the ports in fluid flow communication, and fastening means for retaining said tube in said one valve piece, said fastening means permitting axial sliding movement of the tube relative to said one valve piece, and spring pressed seals in said ports respectively engaging the ends of said tube in the coupled position of said coupling boxes.

EUGENE N. DOUBRAVA.

REFERENCES CITED

The following references are of record in the file of this patent:

UNITED STATES PATENTS

| Number | Name | Date |
| --- | --- | --- |
| 2,373,925 | Townhill | Sept. 20, 1943 |